United States Patent [19]

Albertazzi

[11] 4,347,667

[45] Sep. 7, 1982

[54] APPARATUS FOR THE DIMENSIONAL CHECKING OF A BEARING RING

[75] Inventor: Gastone Albertazzi, Bologna, Italy

[73] Assignee: Finike Italiana Marposs S.p.A., S. Marino di Bentivoglio, Italy

[21] Appl. No.: 182,684

[22] Filed: Aug. 29, 1980

[30] Foreign Application Priority Data

Sep. 14, 1979 [IT] Italy .................................. 3491 A/79

[51] Int. Cl.³ .......................... G01B 7/12; G01B 7/28
[52] U.S. Cl. ................ 33/174 L; 33/178 E; 33/DIG. 17
[58] Field of Search ............ 33/174 L, 174 Q, 178 E, 33/DIG. 17

[56] References Cited

U.S. PATENT DOCUMENTS

| 2,407,490 | 9/1946 | Gregg | 33/DIG. 17 |
| 4,080,741 | 3/1978 | Siddall et al. | 33/178 E |
| 4,279,079 | 7/1981 | Gamberini et al. | 33/178 E |

FOREIGN PATENT DOCUMENTS

| 204757 | 6/1955 | Australia | 33/174 Q |
| 917393 | 9/1954 | Fed. Rep. of Germany | 33/DIG. 17 |
| 1079334 | 4/1960 | Fed. Rep. of Germany | 33/DIG. 17 |
| 55-12407 | 1/1980 | Japan | 33/178 E |
| 558355 | 1/1944 | United Kingdom . | |
| 576002 | 3/1946 | United Kingdom . | |
| 708724 | 5/1954 | United Kingdom . | |
| 834221 | 5/1960 | United Kingdom | 33/DIG. 17 |
| 1472628 | 5/1977 | United Kingdom . | |
| 1476520 | 6/1977 | United Kingdom . | |
| 1514858 | 6/1978 | United Kingdom . | |
| 228974 | 2/1969 | U.S.S.R. | 33/DIG. 17 |

Primary Examiner—Richard R. Stearns
Attorney, Agent, or Firm—Stevens, Davis, Miller & Mosher

[57] ABSTRACT

Apparatus for checking linear geometric dimensions of the raceway of a ball bearing ring. A base supports a rotatable plate, which makes a ring rotate about its geometrical axis, and a mobile arm which applies to gauging heads a reciprocating motion along the transversal direction of the raceway. The gauging heads have relevant feelers which, due to the motion of the gauging heads and the rotation of the ring, contact the raceway surface along lines having an oscillating form. The gauging heads provide signals responsive to the radial dimensions of the ring in correspondence with the raceway. The signals provided by the gauging heads are processed by electronic circuits for obtaining signals responsive to said geometric dimensions, for example signals indicating the raceway minimum diameter.

11 Claims, 9 Drawing Figures

APPARATUS FOR THE DIMENSIONAL CHECKING OF A BEARING RING

The present invention relates to an apparatus for the dimensional checking of the raceway of a bearing ring, with measuring means including feelers adapted to cooperate with the raceway surface; supporting means for supporting the ring and the measuring means, the supporting means permitting a relative scanning motion of the feelers on the raceway surface, along a transversal direction of the raceway; control means for controlling the checking operation; and processing means connected to the measuring means.

Italian patent application No. 3532A/76, made available to public inspection, discloses an apparatus for checking the raceway of a ball bearing ring, which comprises a fixed support for the ring and a slide supporting a gauging head having two feelers; the slide displaces the gauging head to the measuring position through a displacement parallel to the ring axis. Retraction devices act on the feelers for letting them cooperate with the raceway surface only when the feelers are in a position adjacent to the raceway surface. Thus the feelers carry out a scanning motion on the raceway surface along two lines lying on the same axial plane of the ring. The measurement signals obtained during the scanning motion are processed for obtaining signals responsive to the ring diameter in correspondence with the bottom of the raceway.

Other known devices check the ring diameter in correspondence with the bottom of the raceway by two feelers contacting the raceway surface in diametrically opposed points located at a distance from one of the ring sides equal to the nominal or basic distance between the bottom of the raceway and the relevant ring side.

The checking carried out by the apparatus according to the above mentioned Italian patent application is of a static type, because only a diameter value of the raceway bottom is detected and shape errors of the raceway cannot be measured.

In the other known devices previously mentioned, an error in the position of the ring raceway causes the contact of the feeler to take place on the flank of the raceway and not on the raceway middle or bottom, and thus a measurement error arises.

An object of the present invention is to provide an apparatus for the dynamic checking of bearing rings, particularly ball bearing rings, which is simple and accurate.

Another object is to provide an automatic apparatus capable of carrying out very fast measurement operations in order that it may be associated to high production grinding machines which machine the rings.

A further object is to provide a versatile apparatus which may be easily made to fit to the checking of different linear dimensions of the same ring and to the checking of rings having different basic dimensions.

These and other objects are achieved by an apparatus for checking a bearing ring raceway wherein said supporting means permit a further relative scanning motion of the feelers on the raceway surface in the direction of the longitudinal development of the raceway; the first scanning motion being a reciprocating motion; said control means controlling said first and further scanning motions; and wherein the processing means receive the measuring means measurement signals obtained through said scanning motions and provide signals responsive to the radial dimensions of the ring in correspondence with a plurality of cross-sections of the raceway.

The invention will be better understood with reference to the annexed drawing, given for exemplary and not limiting purposes, wherein.

Figure 2:
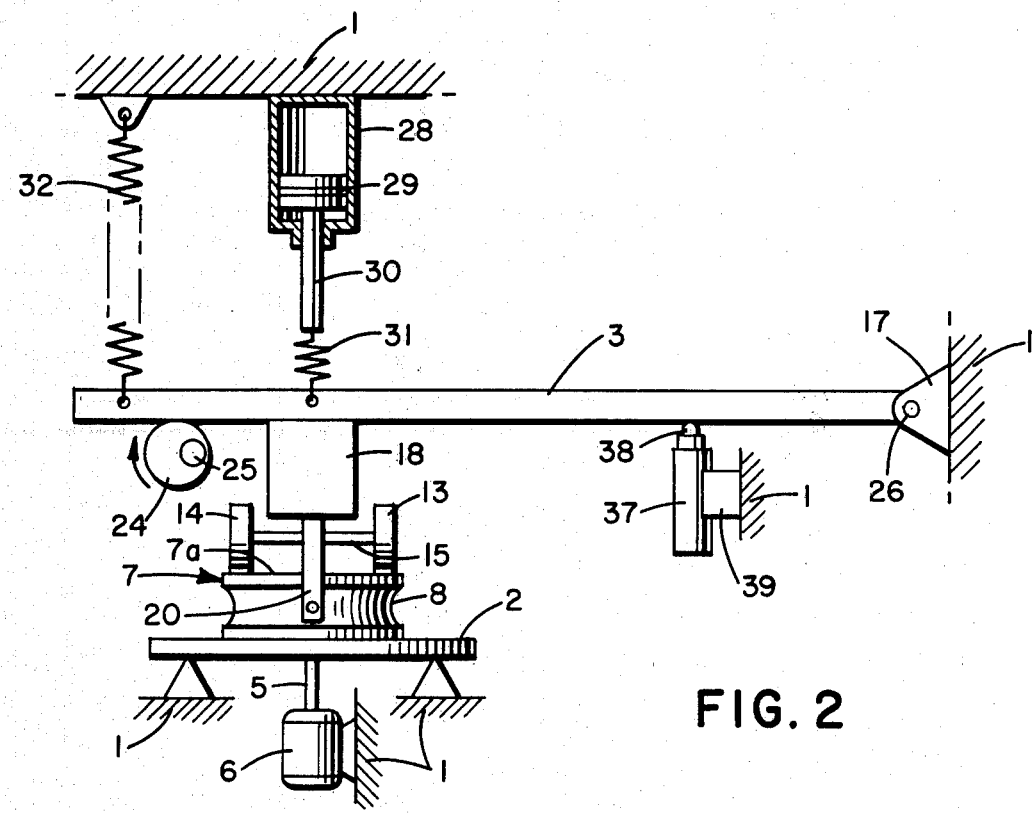
FIG. 2 is a diagrammatic showing of an apparatus for checking the position of a bearing ring raceway having a circular transversal contour.
Figure 6:
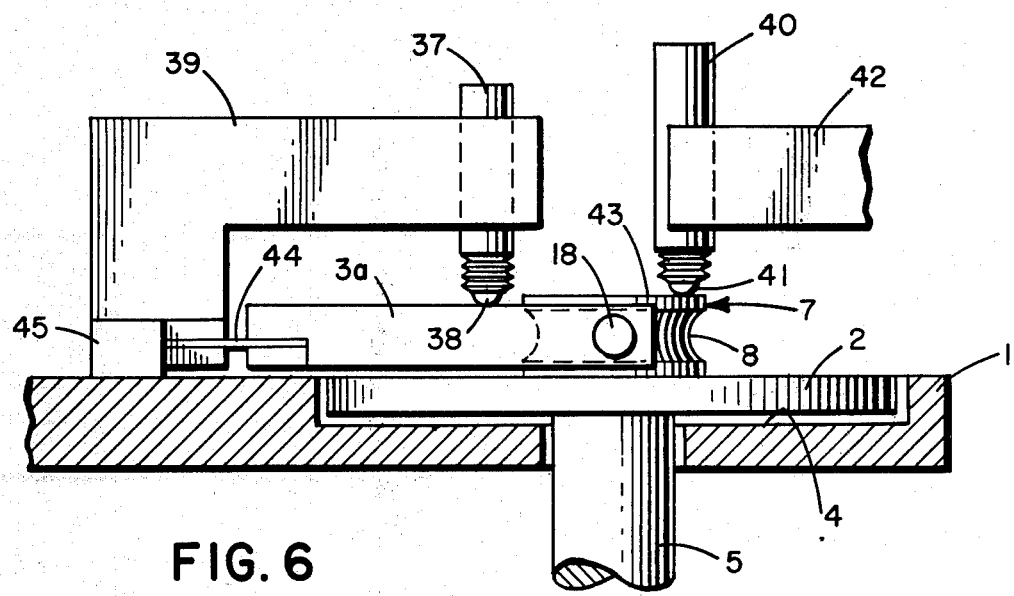

FIG. 6 is a simplified side elevational view of some details of the apparatus of FIG. 2; (bearing ring positioning arms 9, 10; arm 16 and rollers 13, 14 are omitted for clarity)

Figure 1:
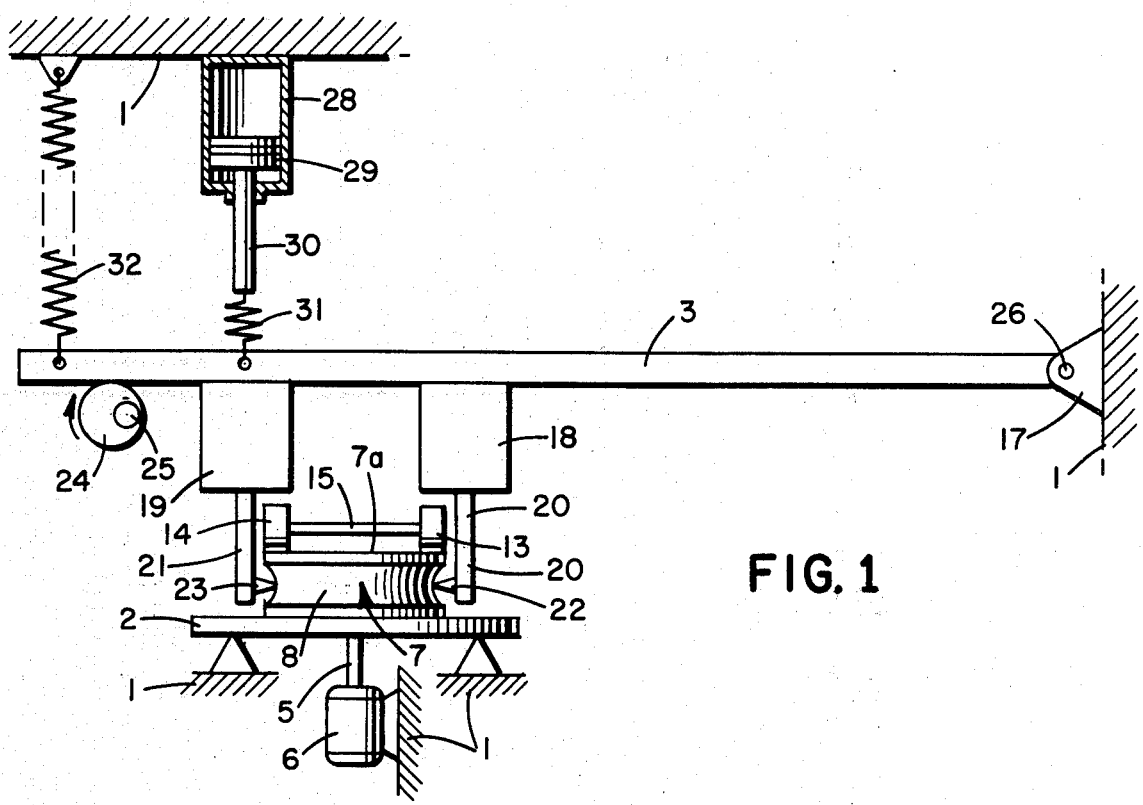
FIG. 1 is a diagrammatic showing of an apparatus for checking the diametral dimension of a ball bearing raceway according to the preferred embodiment of the invention.
Figure 5:
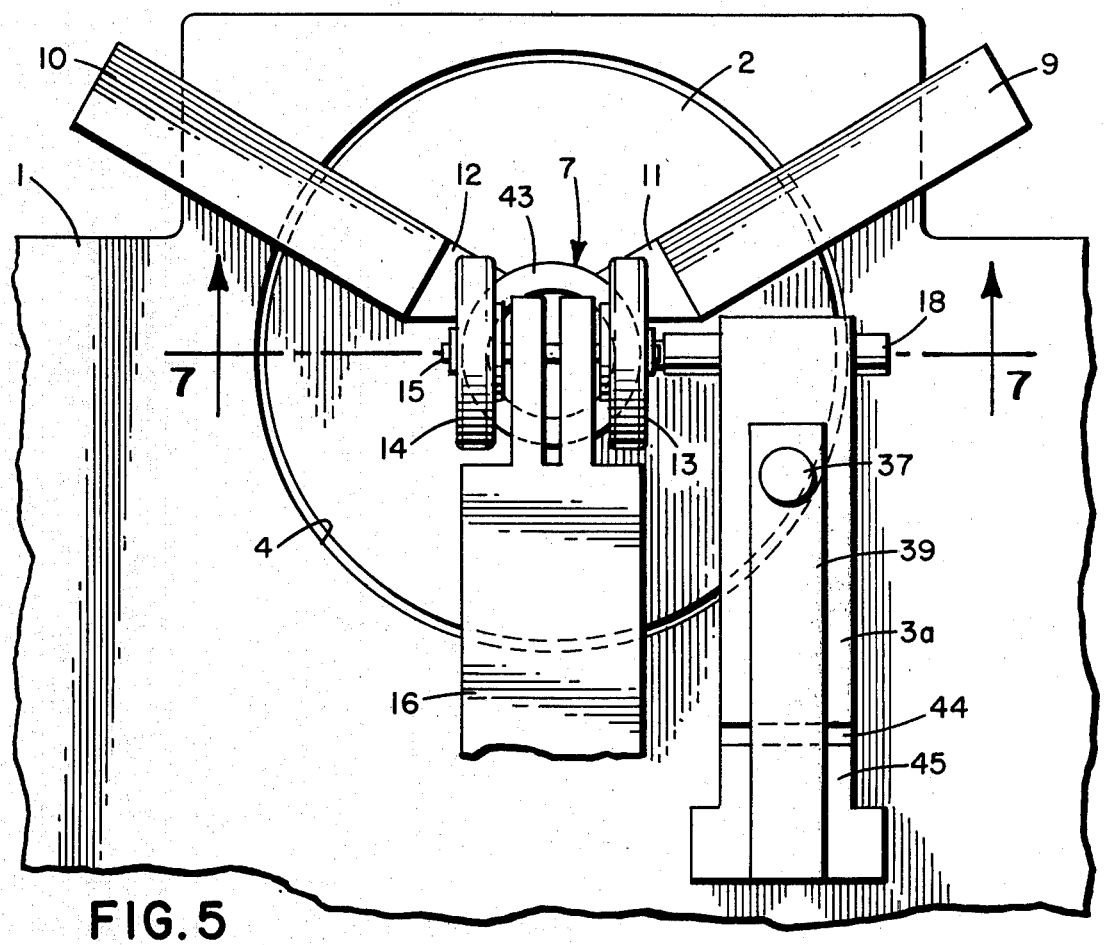
FIG. 5 is a plan view of some details of the apparatus of FIG. 2.
Figure 7:
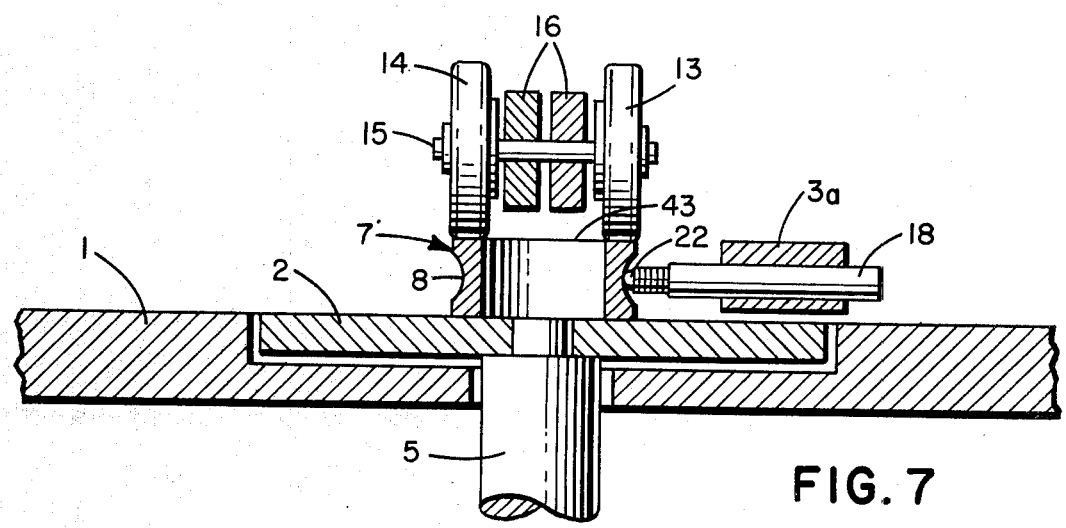
Figure 8:
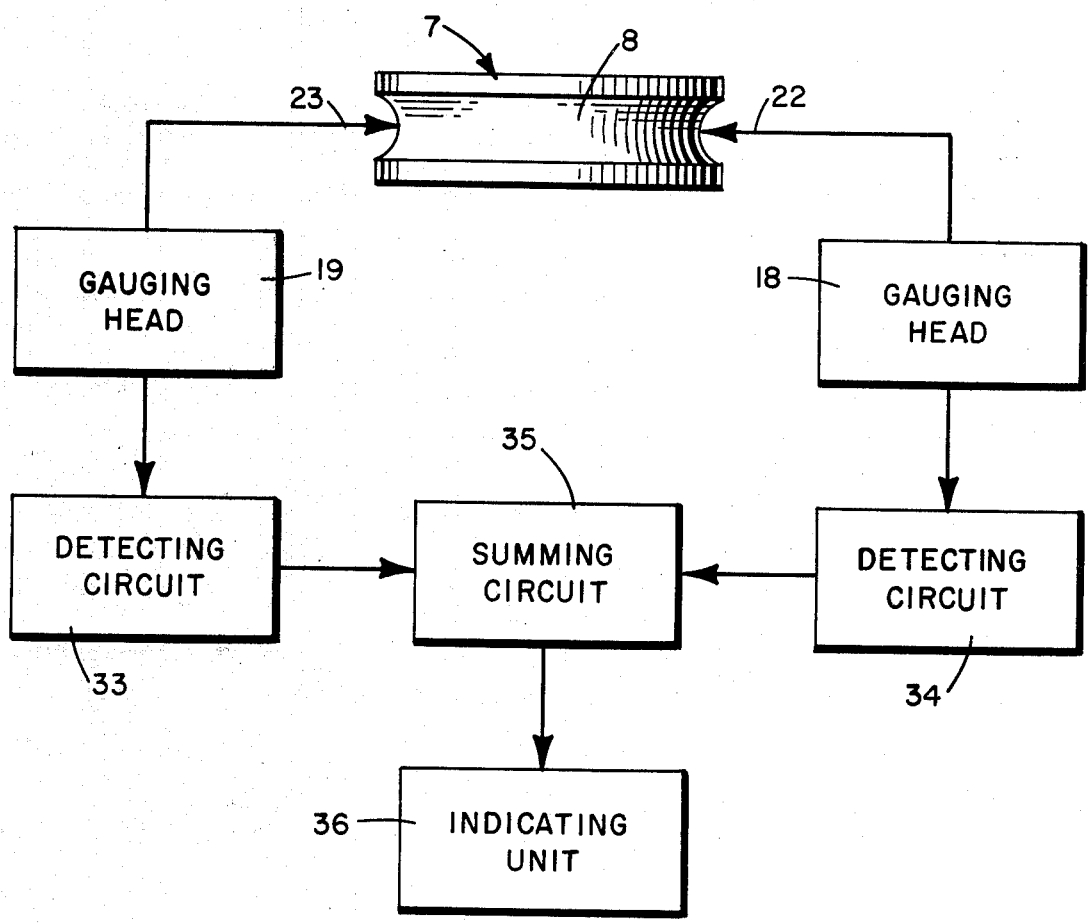

FIG. 7 is a vertical sectional view taken along line 7—7 of FIG. 5; (arms 9, 10 and gauging head 40 are omitted for clarity.);

FIG. 8 is a diagram of the electronic circuits of the apparatus of FIG. 1; and

Figure 9:
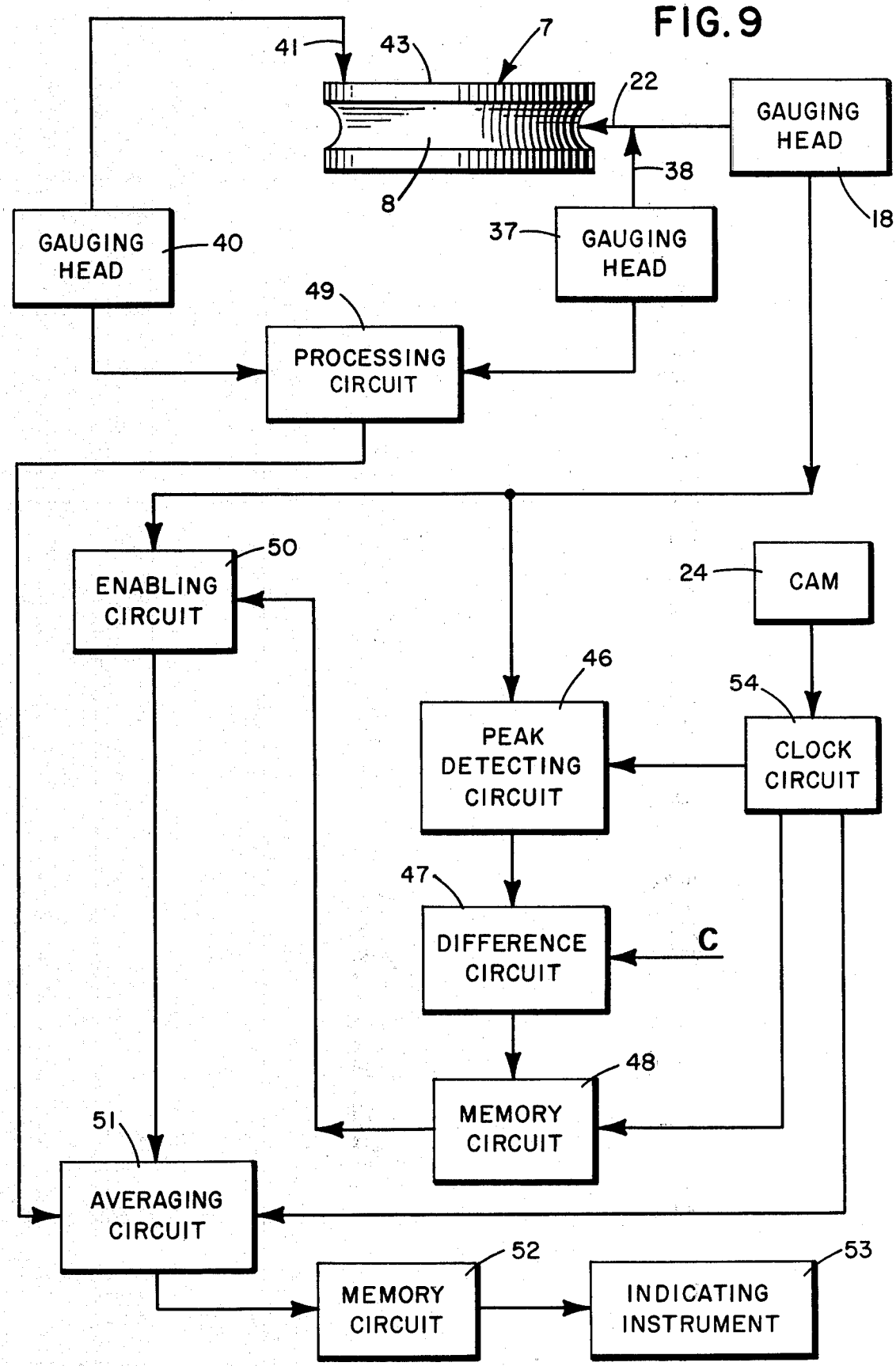

FIG. 9 is a diagram of the electronic circuits of the apparatus of FIG. 2.

Figure 3:
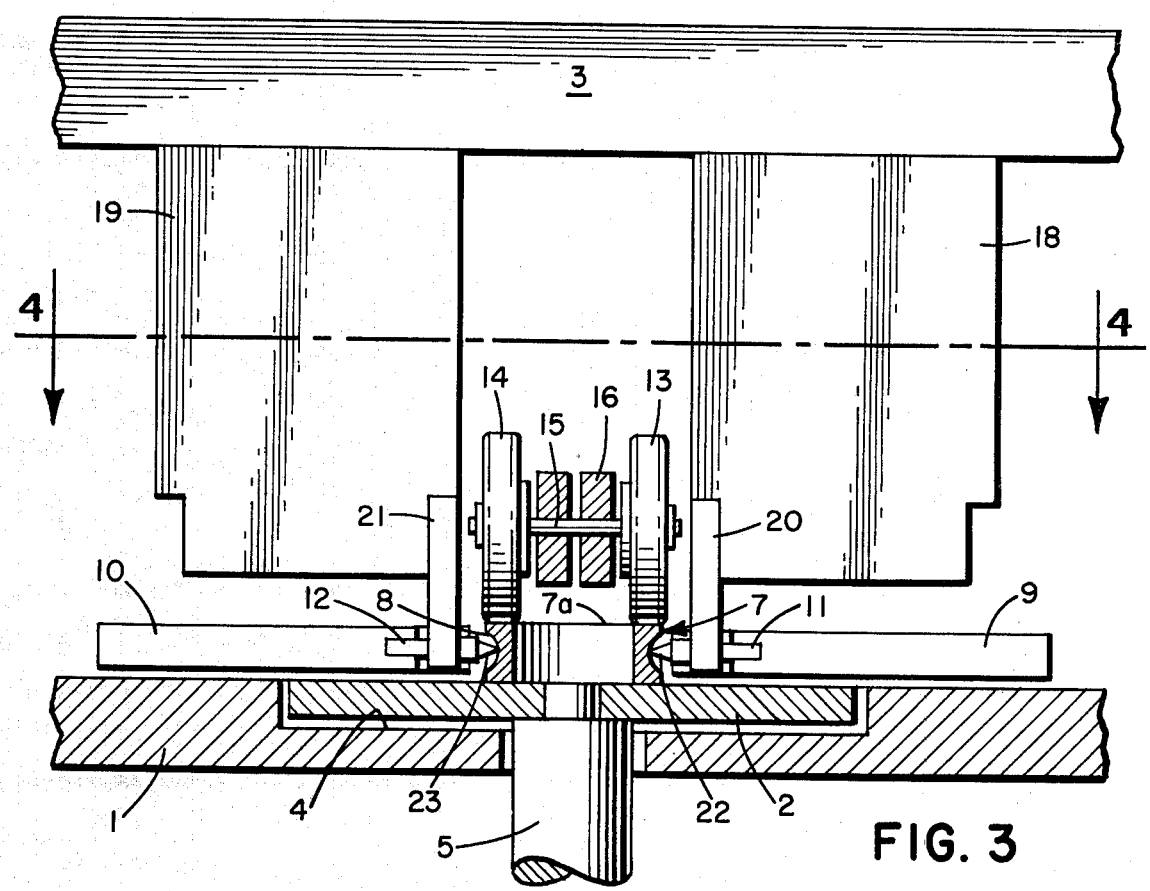
FIG. 3 is a side elevational view, partially in section, of the apparatus of FIG. 1.
Figure 4:
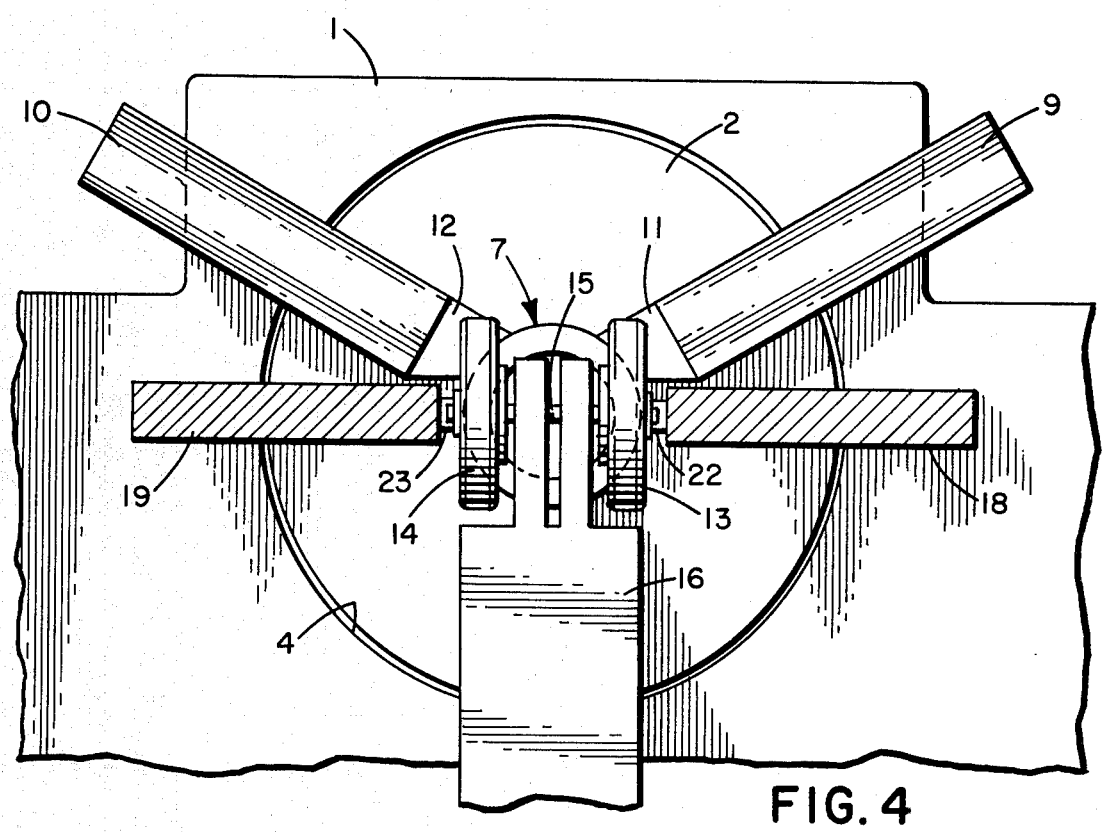
FIG. 4 is a horizontal sectional view taken along line 4—4 of FIG. 3.

The apparatus shown in FIGS. 1,3 and 4 includes a fixed base 1 with a rotary plate 2 and a mobile arm 3. Rotary plate 2 is housed in a recess 4 of base 1 and is coupled, through a shaft 5, to a motor 6 secured to base 1.

A ball bearing ring 7, having a bearing raceway 8, the bottom diameter of which is to be checked, is placed on rotary plate 2.

Two arms 9, 10 are coupled to base 1 through adjustable connections, not shown. At the ends of arms 9, 10 there are shoes 11,12, which contact the surface of raceway 8 and position ring 7 on base 1 in such a way that the ring axis is eccentric with respect to the rotation axis of rotary plate 2.

Two rollers 13,14 rotating on a shaft 15, bear on the annular side of 7a of ring 7 opposite the side which rests on plate 2.

Shaft 15 is supported by a mobile arm 16 which is pivoted in a way not shown in the drawings to base 1. Springs, not shown, connected between arm 16 and base 1, cause rollers 13,14 to apply to ring 7 a downward thrust in an axial direction.

Mobile arm 3 is pivoted onto base 1 by pin 26 in bracket 17. Two gauging heads 18, 19 are adjustably secured to mobile arm 3 so that the gauging heads can be adjusted along arm 3 to fit different size bearing rings. Gauging heads 18 and 19 include movable arms 20, 21 which support feelers 22 and 23, which bear against bearing raceways. Gauging heads 18,19 contain position transducers, not shown, preferably of the differential transformer type, for transforming the displacements of movable arms 20, 21 into electric signals.

A cam 24 secured to a shaft 25 which is driven by a motor, not shown, that is secured to base 1 imparts a reciprocating, oscillating motion to arm 3. The motion of mobile arm 3 causes gauging heads 18,19 to periodically approach to and move away from ring 7. Mobile arm 3 is sufficiently long and the lift of cam 24 is sufficiently small so that the reciprocating motion of gauging heads 18,19 may be considered to lie, substantially, along a straight line parallel to the geometric axis of bearing ring 7.

A cylinder 28 coupled to base 1 houses a piston 29 connected to mobile arm 3 through a rod 30 and a spring 31. Cylinder 28 and piston 29 can raise mobile arm 3 away from ring 7 for permitting removal of a ring which has been checked and the loading of a new ring to be checked; then cylinder 28 and piston 29 move mobile arm 3 back to the measuring position, in contact with cam 24.

Gauging heads 18,19 comprise retraction devices, not shown, which move arms 20,21 and feelers 22,23 away from the surface of raceway 8 before cylinder 28 and piston 29 raises mobile arm 3 and holds them retracted during the operations of removal of the ring already checked and loading of a new ring.

A spring 32, connected to mobile arm 3 and base 1, is provided for counter balancing the weights of arm 3 and gauging heads 18,19. Spring 31 is dimensioned in such a way as to minimize the dynamic stresses and the other stresses applied to the various structures of the apparatus by the action of piston 29.

The operation of the apparatus is as follows: an automatic loading device well known in the art, and therefore not shown, loads ring 7 to be checked onto plate 2 and thrusts it against shoes 11,12. Arm 16 moves rollers 13,14 into contact with ring 7 and applies a force in the axial direction which urges ring 7 against plate 2.

Then motor 6 drives into rotation plate 2 and, dur to the combined effects of the eccentricity between the axis of ring 7 and the rotation axis of rotary plate 2, and of the friction between ring 7 and plate 2, ring 7 is caused to rotate about its axis with a speed substantially equal to that of rotary plate 2 and moreover the ring is urged against shoes 11,12.

Cylinder 28 and piston 29 lower mobile arm 3 and move it to the measuring position, in contact with cam 24. As soon as mobile arm 3 reaches the measurement position, the retraction device of movable arms 20,21 causes the latter to approach the surface of raceway 8, and feelers 22,23 may contact the surface to be checked.

The rotation of cam 24 causes a reciprocating movement of mobile arm 3, along a tranversal direction of raceway 8, while the rotation of plate 2 causes, as above mentioned, the rotation of ring 7.

As a consequence of these two movements, feelers 22,23 scan the surface of raceway 8 along an oscillating line. Movable arms 20,21 transmit the movements of feelers 22,23 to the transducers of the relevant gauging heads 18,19, for providing measurement signals responsive to the radial dimensions of ring 7 in the points contacted by feelers 22, 23.

With reference to FIG. 8, the measurement signals provided by the transducers of gauging heads 18,19 during each oscillation of mobile arm 3 are applied to peak (maximum or possibly minimum) detecting circuits 33,34 which detect, respectively, values representative of the radial dimensions of the ring in correspondence with the two paths of the raceway surface checked during each of said oscillations.

The maximum values of the measurement signals detected during every oscillation are then summed by a summing circuit 35; the output signal of the summing circuit is indicative of the diametral dimensions of ring 7 in correspondence with the bottom of raceway 8 or, more properly, of the deviations of these dimensions from the nominal or basic value.

The sum signal provided by circuit 35 is sent to an indicating unit 36 which may also control a possible sorting device, associated to the apparatus, which may sort the rings according to different classification classes.

The detection of the maximum values during every oscillation of the movement of arm 3 is controlled by enabling circuits, not shown, responsive to the position of cam 24 or to that of mobile arm 3. The enabling circuits control up-dating of circuits 33,34 and that of circuit 35 in such a way that unit 36 continuously receives a signal indicative of the ring diameter at the raceway bottom.

In the apparatus of FIGS. 2,5,6 and 7 parts equal or equivalent to those of the apparatus described before are marked by the same reference numerals and therefore will not be described. It is intended that the apparatus of FIGS. 2,5,6,7 and 9 may be used by itself or in combination with that of FIGS. 1,3,4 and 8.

A single gauging head 18, with a movable arm 20 and a feeler 22, is coupled to arm 3; this gauging head detects radial dimensions of the bearing raceway 18"; of the ring 7.

A gauging head 37 having a feeler 38 (FIGS. 5,6) is coupled to an arm 39 fixed to base 1. Gauging head 37 is provided for detecting the displacements of mobile arm 3 caused by cam 24.

A gauging head 40 having a feeler 41 is connected to base 1 through an arm 42 and detects the position of side 43 of ring 7 with respect to the base 1.

In the embodiment shown in FIGS. 5,6 and 7, instead of pivot pin 26 and bracket 17 there is provided a leaf spring 44 coupled to mobile arm 3a and to a base 45 of arm 39. The section of spring 44 between arm 3a and base 45 acts as a fulcrum for pivotal movement of arm 3a.

The electronic circuits of the apparatus of FIGS. 5,6 and 7 are described with reference to the diagram of FIG. 9.

The measurement signal provided by gauging head 18 is applied to a peak detecting circuit 46 and to an enabling circuit 50.

A difference circuit 47 subtracts a constant quantity C from the values provided by circuit 46; the values obtained in this way are sent to a memory circuit 48 whose output is connected to enabling circuit 50.

The signals provided by gauging heads 37 and 40 are applied to a processing circuit 49 having an output connected to an averaging circuit 51. Averaging circuit 51 is enabled by enabling circuit 50 depending on the values memorized by memory circuit 48 and on the values of the measurement signal provided by head 18.

A clock circuit 54 has an input connected to a sensing device, not shown, which detects the angular position of cam 24 and outputs connected to peak circuit 46, memory circuit 48 and averaging circuit 51, for controlling and synchronizing their operation.

The apparatus operates as follows: ring 7 is loaded onto plate 2, positioned with respect to base 1 and made to rotate with respect to base 1 in the way described for the apparatus of FIGS. 1,3 and 4.

Mobile arm 3 is displaced to the measuring position by piston 29 and cam 24 causes an oscillating displacement of gauging head 18 along the transversal direction of raceway 8.

Feeler 22 contacts the raceway surface describing on it an oscillating path; consequently the transducer of gauging head 18 provides a measurement signal responsive to the radial dimensions of the ring in the points contacted by feeler 22.

During every oscillation of the motion of mobile arm 3 the abovementioned measurement signal is processed by peak detecting circuit 46 which detects the maximum (or possibly the minimum) value of the signal.

Each maximum value obtained in this way represents the radius of the ring in correspondence with the raceway bottom of the raceway portion scanned during each oscillation of the motion of gauging head 18.

Measurement signals provided by gauging heads 37 and 40 are processed by processing circuit 49. The output signal of processing circuit 49 represents at each instant the distance of feeler 22 from side 43 of ring 7.

In order to better understand the operation of the apparatus consider, for example, the (i-1)-th oscillation of the gauging head 18 motion.

During this oscillation circuit 54 enables peak circuit 46 which detects the maximum value of the measurement signal provided by gauging head 18. Difference circuit 47 subtracts a constant quantity C from the maximum value and the difference signal is memorized by memory circuit 48, enabled by circuit 54 at the end of the (i-1)-th oscillation.

Memory circuit 48 acts as a delay circuit which causes the difference signal memorized in the (i-1)-th oscillation to be sent to enabling circuit 50 during the i-th oscillation.

Averaging circuit 51 is enabled by enabling circuit 50 when the measurement signal provided by gauging head 18 becomes equal to the difference value memorized in the (i-1)-th oscillation.

If the value of constant C is chosen properly, during the i-th oscillation the measurement signal provided by gauging head 18 becomes equal to the value memorized during the oscillation (i-1)-th four times, two during the approaching stroke of the gauging head 18 towards rotary plate 2 and two during the moving-away stroke, therefore averaging circuit 51 receives four times an enabling signal from enabling circuit 50.

Averaging circuit 51, controlled by circuit 54, memorizes separately the four values of the signal provided by processing circuit 49 corresponding to the instants when it is enabled, then calculates the arithmetical mean of the four values. It can be assumed, with good approximation, that the four positions of feeler 22 corresponding to the four values memorized by averaging circuit 51 are two by two at the same distance from the bottom of the portion of raceway checked during the i-th oscillation, therefore the mean value calculated by averaging circuit 51 represents the distance of the bottom of the raceway scanned portion from side 43 of ring 7.

The mean value determined by averaging circuit 51 serves for updating a memory 52 at the output of which there is continuously present—since similar remarks to those made for the i-th oscillation are valid for all the oscillations carried out during the checking of ring 7—a signal representing substantially the (possibly variable) distance of the points of the raceway 8 bottom from side 43 of ring 7.

The latter signal may be sent to an indicating instrument 53 or may be utilized for controlling a sorting device associated with the apparatus.

In order to obtain sufficiently accurate checkings by the two apparatuses described above, the period of the periodic oscillating motion of arm 3 must be considerably lower than the time necessary for ring 7 to carry out a complete rotation about its axis.

In practice, apparatuses according to the invention have been built with a period of the oscillating motion 10 to 20 times lower than said time and with a complete checking time (for a ring) of five seconds.

The described apparatuses can be adjusted for checking rings having different basic sizes; to this purpose, in the first apparatus it suffices to displace rods 9,10 with shoes 11,12 in order to locate feelers 22,23 in a diametral plane of the ring and to displace gauging heads 18, 19 longitudinally along mobile arm 3 to adapt their distance to the nominal diameter of the ring to be checked.

Similar operations are also possible for the second apparatus described.

The second apparatus may be utilized, after simple changes in the circuits, for controlling, for example, the transversal shape of the raceway. In fact, if the transversal contour has the shape of a circular arc, by detecting the ring radius during every oscillation on three distinct radial planes passing through the raceway and the relative distances of the three planes, it is possible to measure the deviation of the real diameter of the contour from that of the nominal contour.

The described apparatuses may undergo other changes, for example in the second apparatus a transducer coupled to hinge 17 may be substituted for gauging head 37 and the transducer may be used for measuring the angular displacements of mobile arm 3.

It is also possible to eliminate gauging head 40 if plate 2 can be considered a sufficiently accurate reference for the sides of ring 7.

It is evident that other changes and variants may be made in the described and illustrated apparatuses without departing from the scope of the invention.

What is claimed is:

1. An apparatus for the dimensional checking of the raceway of a bearing ring, comprising measuring means including feelers adapted to cooperate with the raceway surface; supporting means for supporting the ring and the measuring means, the supporting means permitting a relative scanning motion of the feelers on the raceway surface, along a transversal direction of the raceway; control means for controlling the checking operation; and processing means connected to the measuring means, wherein said supporting means permit a further relative scanning motion of the feelers on the raceway surface in the direction of the longitudinal development of the raceway; the first scanning motion being a reciprocating motion; said control means controlling said first and further scanning motions; and wherein the processing means receive the measuring means measurement signals obtained through said scanning motions and provide signals responsive to the radial dimensions of the ring in correspondence with a plurality of cross-sections of the raceway.

2. An apparatus as set forth in claim 1, for checking raceways having a curved transversal contour, wherein said processing means are adapted to detect the values of said signals responsive to the radial dimensions of the ring in correspondence with the bottom of the raceway.

3. An apparatus as set forth in claim 2, wherein said measuring means include two gauging heads with relevant feelers adapted to lie in the same axial plane of the ring, said processing means being adapted to detect the maximum values of the output signals of said gauging heads during every oscillation of the first reciprocating motion and to provide a sum signal of said maximum values relating to corresponding oscillations of the feelers, whereby said sum signal indicates the diametral dimensions of the ring in correspondence with the bottom of the raceway.

4. An apparatus as set forth in claim 2, wherein said measuring means comprise a measuring device adapted to provide a further measurement signal for detecting the position of the feelers on the raceway surface, in transversal direction of the raceway; the processing means being connected to said measuring device for detecting the position of the raceway bottom in the ring.

5. An apparatus as set forth in claim 4, wherein said processing means are adapted to provide a maximum signal responsive to the values of the radial dimensions of the ring in correspondence with the raceway bottom, these values being detected during each oscillation of the first reciprocating motion; the processing means being moreover adapted to subtract a constant value from said values of the radial dimensions and to memorize the resulting difference signal, the processing means detecting the position of the raceway bottom through an average processing of values of said further measurement signal, these values of said further measurement signal being detected depending on said resulting difference signal.

6. An apparatus as set forth in claim 4, wherein said measuring means comprise gauging head means with two feelers adapted to contact the raceway surface, said support means comprising a fixed base with positioning devices for the ring, a support device for said measuring device and a mobile arm for supporting said gauging head means, said mobile arm being movable with respect to the fixed base with a reciprocating angular movement for realizing said first reciprocating motion.

7. An apparatus as set forth in claim 6, wherein said further scanning motion includes a rotational movement of the ring about its geometric axis; the first and further scanning motions being periodic motions, the period of the first scanning motion being considerably lower than that of the further scanning motion, for permitting a proper scanning along the transversal direction of the raceway while the ring is rotating about its geometric axis.

8. An apparatus as set forth in claim 7, wherein said supporting means and control means comprise a motorized rotary plate supporting the ring and thrust devices for thrusting the ring against the rotary plate.

9. An apparatus as set forth in claim 8, wherein said thrust devices include rollers for applying a resilient thrust action to the ring.

10. An apparatus as set forth in claim 6, wherein said control means include a rotatable eccentric device for applying said reciprocating angular movement to said mobile arm.

11. An apparatus as set forth in claim 10, wherein the measuring means and control means comprise retraction devices for moving the feelers away from the raceway surface and a control device for moving the mobile arm away from the fixed base, for permitting unloading of a ring already checked and loading of a new ring to be checked.

* * * * *